March 30, 1965 G. G. WARD 3,175,624
TWO-WAY PLOW ACTUATING MECHANISM
Filed Oct. 23, 1963 2 Sheets-Sheet 1

Inventor
Gerald G. Ward

March 30, 1965 G. G. WARD 3,175,624
TWO-WAY PLOW ACTUATING MECHANISM
Filed Oct. 23, 1963 2 Sheets-Sheet 2

Inventor
Gerald G. Ward
J K McNair
Attorney

United States Patent Office 3,175,624
Patented Mar. 30, 1965

3,175,624
TWO-WAY PLOW ACTUATING MECHANISM
Gerald G. Ward, Naperville, Ill., assignor to International Harvester Company, Chicago, Ill., a corporation of New Jersey
Filed Oct. 23, 1963, Ser. No. 318,357
8 Claims. (Cl. 172—225)

This invention relates to agricultural implements and particularly to two-way plows. More specifically, the invention concerns novel actuating mechanism for reversing a two-way plow.

The invention is particularly applicable to the roll-over type of two-way plow which is revolved to alternate the plow bottoms from right to left-hand plowing. Such plows are well known, and it is customary to revolve them with a hydraulic ram or cylinder device relying upon the extension stroke of the piston in the cylinder to rotate the plow carrier to one of its positions and the retraction stroke to revolve the carrier to its alternate position. Such an operation requires a cylinder with a rather long stroke, and the present invention contemplates and has for its object the provision of novel actuating mechanism for revolving a roll-over two-way plow.

Another object of the invention is the provision of improved actuating mechanism for revolving the tool-carrier of a roll-over two-way plow with a relatively short stroke hydraulic cylinder, wherein the retraction and extension strokes of the cylinder are utilized in revolving the plow units to reverse the direction of travel.

Apparatus using both the retraction and extension strokes of a cylinder to revolve a two-way plow carrier in one direction have in the past encountered obstacles due to the difficulty of getting the tool-carrier started in the right direction after it has been raised for transport and the carrier revolves part way to a central neutral position. Another object of the invention is, therefore, the provision of an improved roll-over mechanism designed to assure the smooth transition from one operating position to the other.

Other objects and advantages of the invention will become clear from the following detailed description when read in conjunction with the accompanying drawings, wherein:

FIGURE 3 is a sectional detail of a portion of the structure shown in FIGURE 1.

Figure 1:
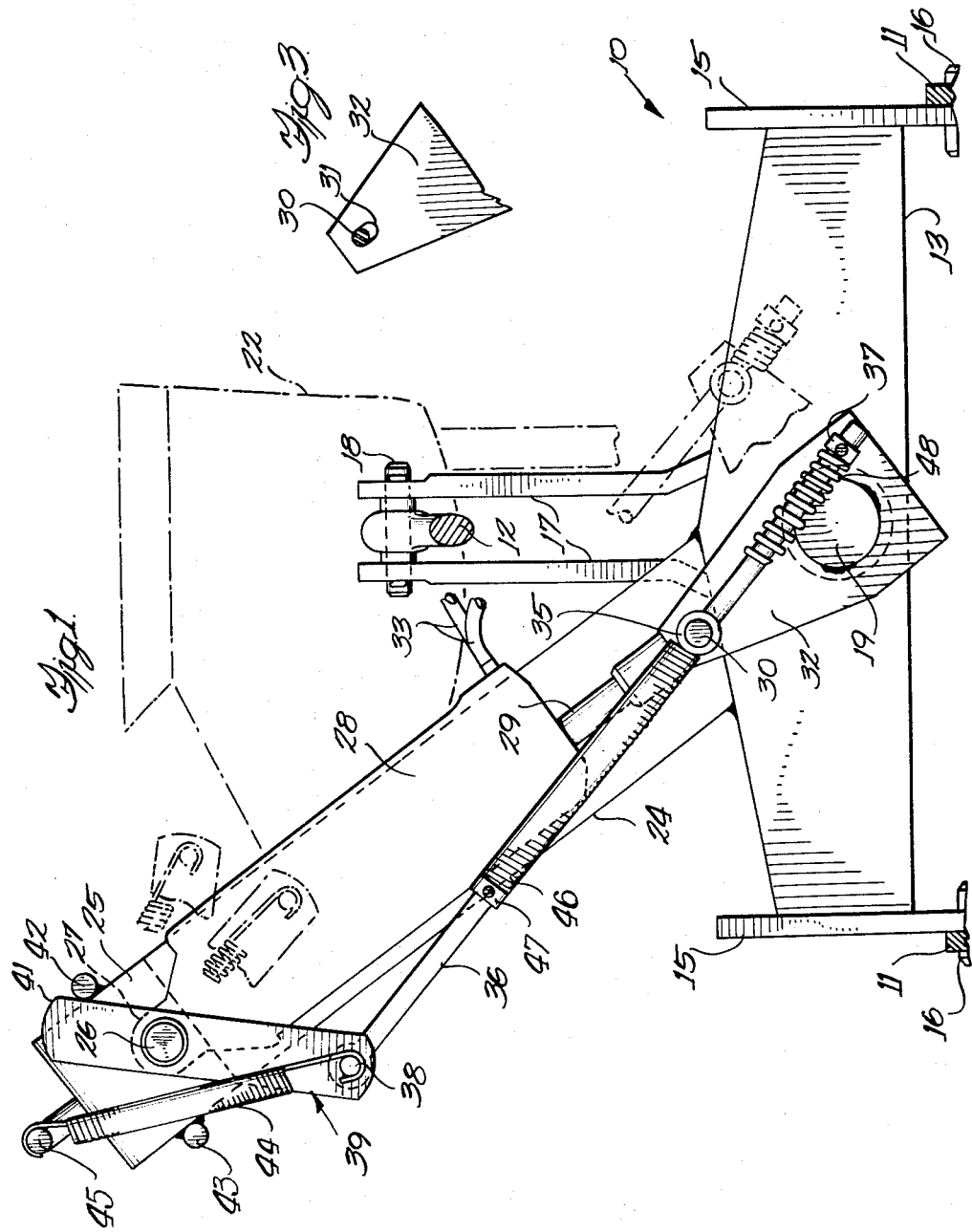
FIGURE 1 is an elevation, partly in section and with parts removed, of the front end of a two-way plow of conventional construction, showing the actuating mechanism of this invention.

In the drawings numeral 10 designates generally the relatively stationary supporting frame of a two-way plow adapted to be mounted upon a tractor, not shown, having implement connecting means thereon such as the three-point linkage represented by laterally spaced lower links 11 and upper link 12.

The implement frame 10 includes a transversely extending plate section 13 and a longitudinally extending tubular section 14 receivable in and extending through a central opening provided in plate 13. Depending plates 15 are fixed to the ends of plate 13 and are provided with pivot pins 16 to which are connected the rear ends of lower hitch links 11. A pair of standards 17 are secured at their lower ends to the tubular member 14 and are apertured at their upper ends to receive a pivot pin 18 upon which is mounted the rear end of upper tractor hitch link 12. Conventional means are provided on the tractor to which the implement is attached for raising and lowering the hitch links 11 and 12 for vertically moving the implement between operating and transport positions. The tubular portion 14 of the relatively stationary main frame 10 of the implement rotatably receives the forwardly extending tubular portion 19 of a tool-carrying sub-frame designated at 20.

Figure 2:
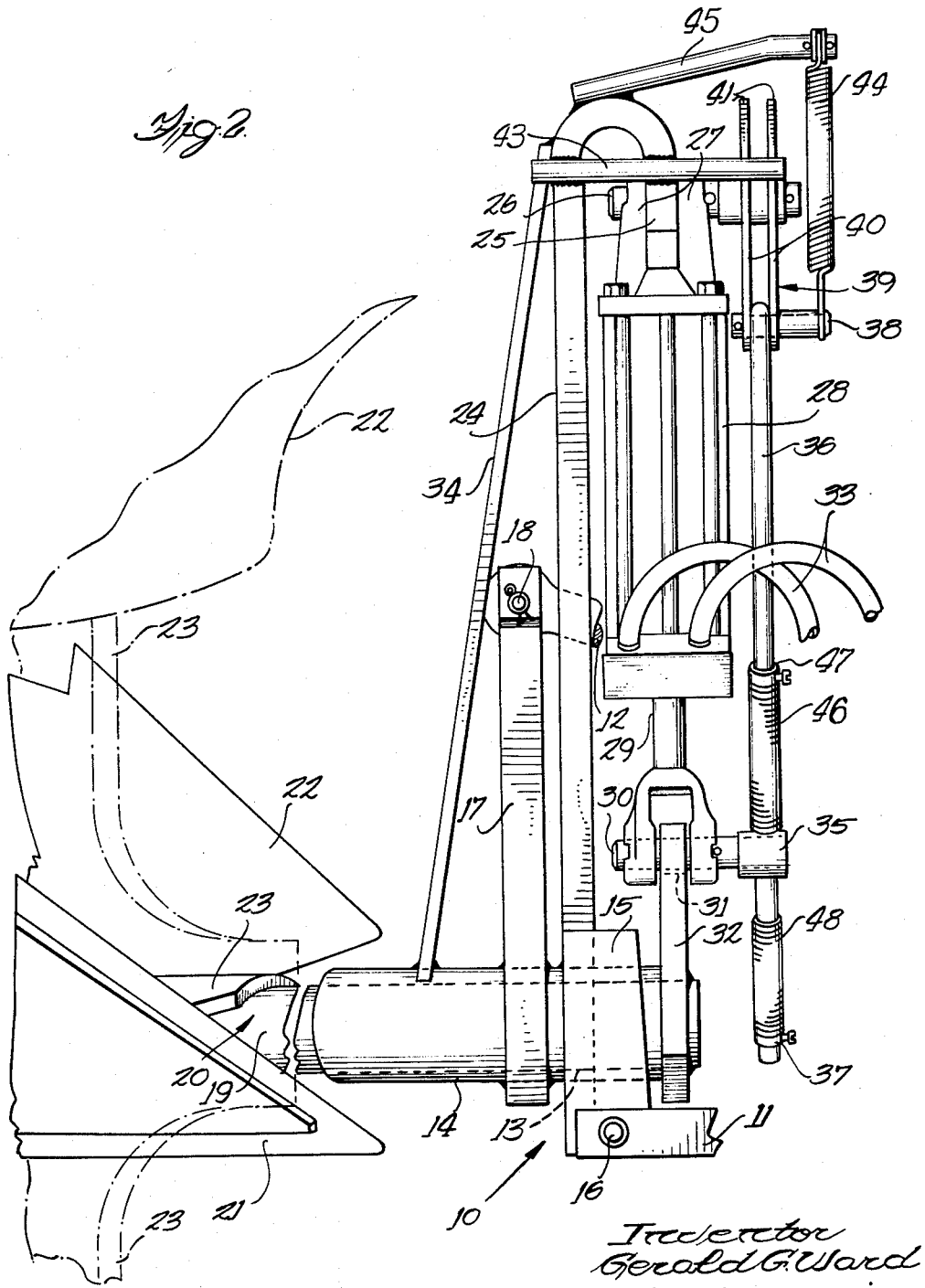
FIGURE 2 is a view in side elevation, with parts removed, of the structure shown in FIGURE 1.

One or more right-hand plow bottoms 21 and left-hand plow bottoms or units 22 are suitably mounted on the tool-carrier 20 by means of standards 23. Tool-carrier 20 is revolved about the axis of tubular member 14 approximately 180 degrees alternately between right and left-hand plowing positions. In FIGURE 2 in dotted lines is shown an operating position of the plow units disposed for right-hand plowing and in solid lines the plow units 21 and 22 are shown in a medial or neutral transport position with both plow units disposed in a horizontal plane. FIGURE 1 indicates in dotted lines the non-operating position of the alternately operating left-hand plow unit 22, and by rotating the tool-carrier 20 clockwise as viewed in FIGURE 1, left-hand plow unit 22 is moved into its operating position while the right-hand plow unit is moved to the non-operating position thereof.

The apparatus by which the tool-carrier 20 is revolved about the axis of member 14 includes a bracket 24 affixed at its lower end to and extending diagonally upwardly from cross member or plate 13 of the relatively stationary frame 10. The upper end of bracket 24 is bent forwardly and downwardly to provide a depending leg 25 which is apertured to receive a pin 26. A clevis 27 at one end of the hydraulic cylinder or ram unit 28 is mounted on the pivot pin 26 and a piston rod 29 slidable in the cylinder is pivotally connected to a pin 30 carried in a slot 31 in the upper end of a rock arm 32 affixed, as by welding, to the forward end of member 19, projecting from the forward end of tube 14.

Hydraulic cylinder 28 is a double-acting cylinder supplied with fluid under pressure through hose lines 33 from any suitabl source of fluid under pressure, preferably on the tractor upon which the implement is mounted. The extension and retraction strokes of the piston rod 29 are utilized to alternately rock arm 32 in clockwise and counterclockwise directions as viewed in FIGURE 1 to alternately dispose the right and left-hand plow bottoms in operation. Reaction of the cylinder 28 is taken by bracket 24, which is braced by a member 34 affixed, as by welding, to the upper end of bracket 24 and to tubular member 14. The drawings show the position of the parts when the implement is in a transport or neutral position with the right and left-hand plowing units disposed in a horizontal plane above the ground.

In FIGURE 1 it will be seen that the axis of pin 30 is on-center with respect to the axis of pin 26 and carrier 19. The tool-carrier 19 has been revolved from a position in which right-hand plow bottom 21 was in operation by a retraction of piston rod 29 in the cylinder to rock the arm 32 clockwise approximately 90° to the position of FIGURE 1. Since cylinder 28 is in alignment with arm 32 means are provided for moving the axis of pin 30 clockwise off-center with respect to the axes of pins 26 and carrier 19 so that upon the next extension stroke of the cylinder, arm 32 will be revolved to the dotted line position shown in FIGURE 1.

In order to throw pivot 30 off-center, mechanism is provided including a cap 35 mounted on the forward end of pin 30 and apertured to slidably receive a rod 36 carrying an adjustable collar 37 at its lower end and pivoted at its upper end upon a pin 38 mounted on the lower end of a lever 39 comprising spaced straps 40 fulcrumed medially of their ends upon pin 26 and having a projecting arm portion 41 engageable with a stop 42 welded to one side of bracket 24 near the top thereof, a corresponding stop 43 being welded to the other side of the bracket. A spring 44 is anchored at one end to pin 38 and at its upper end to a hanger 45 welded to the upper end of bracket 24 and projecting forwardly therefrom.

In the position of the parts shown in FIGURE 1, spring 44 is urging lever 39 in a clockwise direction to cause the extension arm 41 to engage stop 42. A spring 46 surrounding rod 36 engages cap 35 at one end and at its other end an adjustable collar 47.

In this position spring 46 is under compression, and upon actuation of cylinder 28 to extend piston rod 29 therein, pin 30 at the end of the rod moves downwardly in slot 31 while spring 46 moves pin 30 off-center clockwise to allow the cylinder in its extension stroke to rock the arm 32 and therefore tool-carrier 19 clockwise to the dotted line position of FIGURE 1, the left-hand plow bottom 22 thus moving into the operating position while the right-hand unit 21 is in its non-operating position.

As arm 32 rocks clockwise to the dotted line position of FIGURE 1 a coil spring 48 surrounding the lower projecting end of rod 36 is compressed between collar 37 and cap 35 and lever 39 swings counterclockwise to the first dotted line position thereof shown in FIGURE 1. Upon again retracting cylinder 28 after lifting the implement from the ground, to reverse the tool-carrier 19 and return the right-hand plow unit to its operating position the pressure of spring 48 is relieved and spring 43 becomes effective to swing lever 39 to the second dotted position of FIGURE 1, corresponding to the solid line position of lever 39 and rod 36 on the opposite side of the axis of pin 26, extension 41 of lever 39 then engaging stop 43. Spring 46 then again becomes effective upon extension of the cylinder to move pin 30 to the bottom of slot 31 to move arm 32 over-center counterclockwise to reverse the direction of plowing.

It is believed that the construction and operation of the two-way moldboard plow actuating mechanism of this invention will be clearly understood from the foregoing description. It should likewise be understood that the invention has been described in its preferred embodiment and that modifications may be made therein without departing from the spirit of the invention or the scope of the appended claims.

What is claimed is:

1. In a two-way plow of the roll-over type having a relatively stationary main frame adapted for connection to a tractive vehicle and a longitudinally extending tool-carrying frame mounted on the main frame, said tool-carrying frame having alternately operable right and left-hand plow units thereon and including a tubular portion mounted on the main frame for rotation about a longitudinal axis to alternately dispose said units in operation and having its forward end projecting beyond the main frame, a rock arm affixed to said forward end of said tubular portion and projecting radially therefrom, said arm being rockable to opposite sides of a central neutral position to alternately dispose said plow units in operation, and means for rocking said arm to rotate the tool-carrying frame, comprising an upright support affixed to the main frame adjacent said rock arm, a hydraulic cylinder pivotally anchored at one end to the support and having a pivotal connection at its other end to the end of said arm, said pivotal connection being on-center with the cylinder anchor and the axis of the tool-carrying frame in the neutral position of said plow units, and means carried by the support operatively connected to said arm and automatically effective upon rocking said arm in one direction from a position corresponding to one of the operating positions of said plow units to said on-center position to move said pivotal connection off-center in said one direction.

2. In a two-way plow of the roll-over type having a relatively stationary main frame adapted for connection to a tractive vehicle and a longitudinally extending tool-carrying frame mounted on the main frame, said tool-carrying frame having alternately operable right and left-hand plow units thereon and including a tubular portion mounted on the main frame for rotation about a longitudinal axis to alternately dispose said units in operation and having its forward end projecting beyond the main frame, a rock arm affixed to said forward end of said tubular portion and projecting radially therefrom, said arm being rockable to opposite sides of a central neutral position to alternately dispose said plow units in operation, and means for rocking said arm to rotate the tool-carrying frame, comprising an upright support affixed to the main frame adjacent said rock arm, a hydraulic cylinder pivotally anchored at one end to the support and having a pivotal connection at its other end to the end of said arm, said hydraulic cylinder being operable to rock said arm in opposite directions about the axis of said tool-carrying frame to alternately dispose said plow units in operating positions for right and left-hand plowing, said pivotal connection being on-center with the cylinder anchor and the axis of the tool-carrying frame in the neutral position of said plow units, said pivotal connection including a pivot pin, a rod pivotally connected at one end to the support and having a slidable connection at its other end to said pivot pin, and a compression spring surrounding said rod and operatively engaging said pivot pin, said spring being arranged, in the neutral position of said arm to bias said pivotal connection off-center in the direction of rocking of said arm to dispose one of said plow units in its operating position.

3. The invention set forth in claim 2, wherein lost motion is provided in the pivotal connection of the cylinder to said arm to accommodate limited extension of the cylinder before actuation of said arm.

4. The invention set forth in claim 3, wherein the connection of said rod to the support is laterally displaced from a centerline through said pivotal connection and the connection of the cylinder to the support and said spring exerts a force, during rocking of said arm in one direction to rotate the tool-carrying frame and dispose one of said plow units in its operating position, to bias said pivotal connection off-center in said one direction.

5. The invention set forth in claim 4 wherein the connection of said rod to the support is movable from one side to the other of said centerline to dispose the spring in a position to bias said pivotal connection off-center in the other direction, when said arm is rocked in said other direction to dispose the other of said plow units in its operating position.

6. The invention set forth in claim 5, wherein the connection of said rod to the support includes a lever fulcrumed on the pivotal connection of said hydraulic cylinder to the support and connected at its end to said rod, said lever being movable with said connection of the rod to the support.

7. The invention set forth in claim 6, wherein an extension spring is anchored at one end to the support and at its other end to the connection of said lever to said rod to hold said latter connection on one side of said centerline and swingable with the lever to the other side of said centerline.

8. The invention set forth in claim 7, wherein a collar is provided on the end of said rod remote from the lever, and another spring surrounding the rod is placed under compression between the collar and said pivotal connection when said arm is rocked to one of its positions corresponding to the operating position of one of said plow units by extension of the cylinder.

No references cited.

T. GRAHAM CRAVER, *Primary Examiner.*